No. 637,747. Patented Nov. 21, 1899.
C. M. DURNELL.
CULTIVATOR.
(Application filed Sept. 5, 1899.)
(No Model.)
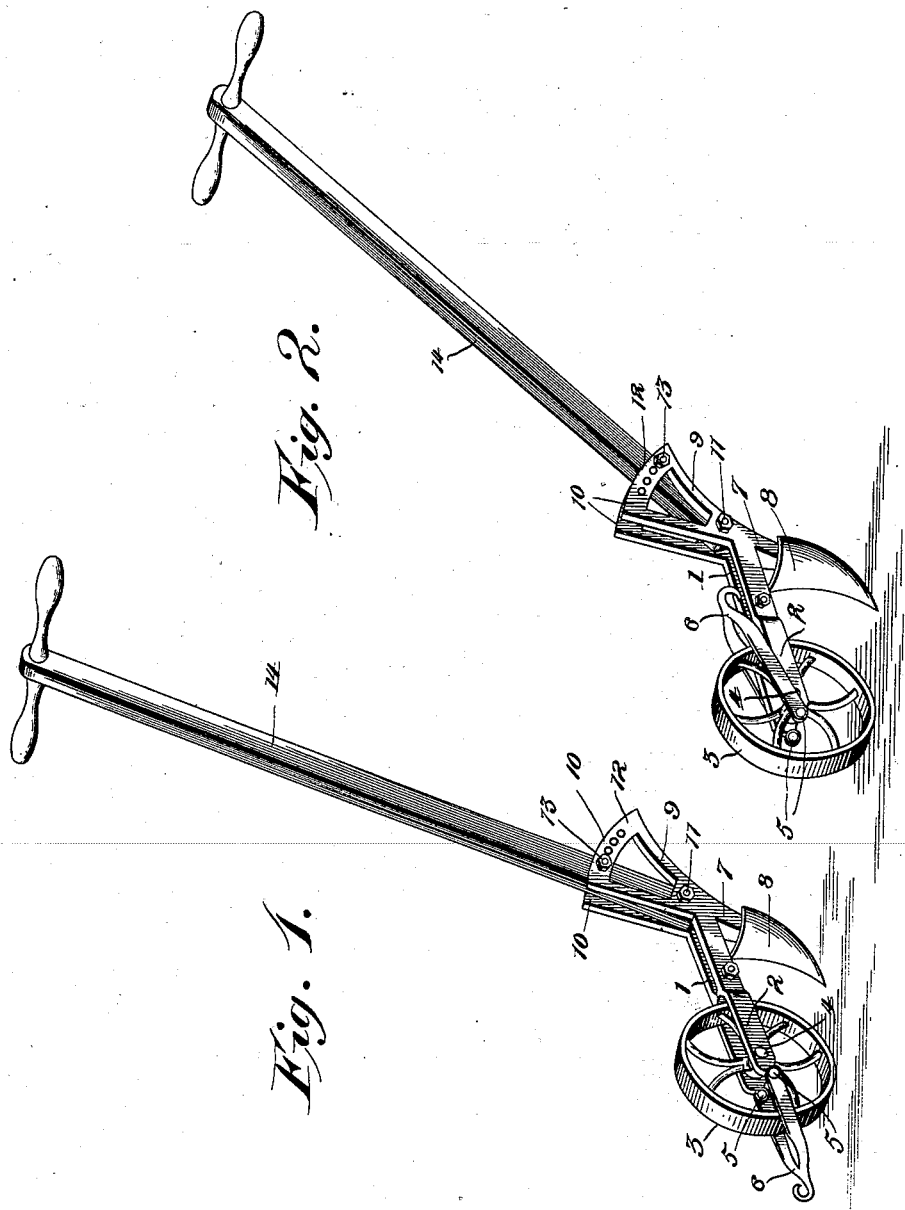
Witnesses
Clarence L. Walker
Louis G. ...
Cecil M. Durnell  Inventor
By his Attorneys,
C. A. Snow & Co.
THE NORRIS PETERS CO., PHOTO-LITHO., WASHINGTON, D. C.

UNITED STATES PATENT OFFICE.

CECIL M. DURNELL, OF INDEPENDENCE, MISSOURI, ASSIGNOR TO REUBEN D. WIRT AND CHARLES E. KNOX, OF SAME PLACE.

CULTIVATOR.

SPECIFICATION forming part of Letters Patent No. 637,747, dated November 21, 1899.

Application filed September 5, 1899. Serial No. 729,496. (No model.)

*To all whom it may concern:*

Be it known that I, CECIL M. DURNELL, a citizen of the United States, residing at Independence, in the county of Jackson and State of Missouri, have invented a new and useful Cultivator, of which the following is a specification.

My invention relates to that class of agricultural devices known as "garden-cultivators;" and its object is to produce a cultivator which can be readily manipulated by hand, but which can be quickly adapted for propulsion by a draft-animal.

The invention therefore consists in the provision of a novel clevis which may be quickly thrown into position for use with a draft-animal or may be thrown back upon the beam of the cultivator when it is desired to actuate the latter manually. It also comprehends a handle having a number of angular adjustments in order that it may be positioned in practical alinement with the standard when it is desired to employ the device as a hand-cultivator or may be thrown back into approximate alinement with the beam of the device when connected with a draft-animal.

Referring to the drawings, Figure 1 is a perspective view of my device complete, showing the clevis thrown forward and the handle positioned to facilitate the manipulation of the cultivator when drawn by a horse; and Fig. 2 is a similar view showing the clevis thrown back and the handle adjusted for manual operation.

Referring to the numerals of reference on the accompanying drawings, 1 indicates the beam of my cultivator, bifurcated, as indicated at 2, for the reception of the wheel 3, mounted upon the axle 4, extending between the bifurcations. The ends of the sides of this bifurcation are provided with eyes 5, designed to pivotally retain the rear ends of a substantially U-shaped clevis 6, straddling the wheel and which when the device is not designed for employment in connection with a draft-animal may be thrown back to the position indicated in Fig. 2 of the drawings.

The numeral 7 indicates the standard upon which is mounted the share 8, and 9 indicates what may be termed a "handle-frame," comprising a pair of upwardly and rearwardly extending segmental plates 10, mounted at the rear end of the beam and connected at their lower ends by a pivot-bolt 11, upon which the handle is mounted, and adjacent to their upper edges with arcuate series of apertures 12, designed for the reception of a bolt 13, which is passed through an opening in the handle 14 and which by its adjustment in the several apertures of the series constitutes means for changing the inclination of the handle to accommodate the device, as heretofore stated, for use as a hand or horse cultivator.

What I claim is—

1. In a cultivator, the combination with a bifurcated beam, a wheel mounted therein, and a clevis supported thereby and adapted to be thrown back upon the beam, of a handle-frame at the rear end of the beam comprising a pair of parallel segmental plates provided with corresponding series of openings and connected by a pivot-bolt, an adjustable handle mounted upon the bolt, and a pin extending through corresponding openings in the plates and the handle and designed to fix the latter in its adjusted positions.

2. In a cultivator, the combination with a beam, a wheel mounted thereon, and a share carried by the beam, of a pair of upwardly and rearwardly inclined plates, provided with an arcuate series of perforations, a handle located between the plates and pivoted at its lower end, and a fastening extending transversely through the handle, and for engagement with any of the corresponding perforations in the plates.

3. In a cultivator, a beam having a front longitudinal bifurcation, a wheel mounted in said bifurcation, a standard pendent from the rear end of the beam, a share carried by the standard, upwardly and rearwardly extending substantially parallel plates at the rear end of the beam, and provided with an arcuate series of corresponding perforations, a bolt connecting the lower ends of the plates, a handle having its lower and forward end loosely received between the plates and pivoted to the connecting-bolt thereof, and a fastening passing transversely through the handle, and for engagement with corresponding perforations in the plates.

In testimony that I claim the foregoing as my own I have hereto affixed my signature in the presence of two witnesses.

CECIL M. DURNELL.

Witnesses:
THOS. C. ATTERBURY,
L. A. HALL.